Aug. 7, 1951 J. O. JACKSON 2,563,118
DOUBLE WALLED INSULATED TANK OR CONTAINER FOR
STORING LOW-TEMPERATURE LIQUEFIED GASES
Filed Feb. 2, 1945 8 Sheets-Sheet 1

Fig. 1

INVENTOR
James O. Jackson
By Green + McCallister
His Attorneys

Aug. 7, 1951  J. O. JACKSON  2,563,118
DOUBLE WALLED INSULATED TANK OR CONTAINER FOR
STORING LOW-TEMPERATURE LIQUEFIED GASES
Filed Feb. 2, 1945  8 Sheets-Sheet 7

INVENTOR
James O. Jackson
By Strain & McCallister
His Attorneys

Patented Aug. 7, 1951

2,563,118

UNITED STATES PATENT OFFICE 2,563,118

DOUBLE WALLED INSULATED TANK OR CONTAINER FOR STORING LOW-TEMPERATURE LIQUEFIED GASES

James O. Jackson, Crafton, Pa., assignor to Pittsburgh-Des Moines Company, a corporation of Pennsylvania Application February 2, 1945, Serial No. 575,914

24 Claims. (Cl. 220—15)

This invention relates to insulated tanks or containers and more particularly to double walled insulated tanks or containers for storing, at about atmospheric pressure, relatively great quantities of liquefied gas such as liquefied natural gas, liquefied methane, liquefied oxygen, etc.

Double walled insulated spherical tanks or containers, each capable of holding or storing a relatively great quantity of liquefied natural gas, have been built. Each such tank or container comprises an inner spherical shell and an outer spherical shell surrounding and spaced from such inner shell.

The inner shell is about 57 feet in diameter and is fabricated from separately formed spherical segments of nickel steel plate. These plate segments are joined together by deposited weld metal of special alloy.

The outer spherical shell is fabricated from formed segments of low carbon tank steel. The outer shell is spaced about three feet from the inner shell.

The outer shell is supported above the ground and the inner shell is supported from the outer shell by molded slabs of cork board which fill the space between the shells and extend upwardly about 45° from the lower polar region of the tank.

Each of these tanks was designed to hold about 80,000 cubic feet of liquefied natural gas.

The thickness of the plates from which such spherical shells are fabricated increases as the size of the shells increases and the amount of weld metal used in welding the plate sections together increases as the square of the plate thickness. Because of this, the cost of these spherical tanks increases rapidly when the storage capacity exceeds 80,000 cubic feet. As a matter of fact, when 80,000 cubic feet is exceeded, the cost of these spherical tanks increases so rapidly with relation to the increase in storage capacity that the cost is prohibitive.

An object of this invention is to produce an insulated container capable of holding and storing, at around atmospheric pressure, low temperature liquefied gas in quantities greatly exceeding 80,000 cubic feet, without increasing the thickness of the plates from which such tank or container is fabricated over the plate thickness necessary in a spherical container constructed to hold and store about 50,000 feet of such liquefied gas.

Another object is to produce a tank or container for storing in excess of 50,000 cubic feet of liquefied gas at about atmospheric pressure in which the plates from which the tank or container is fabricated can be of less thickness than the thickness necessary in fabricating a spherical container of the same capacity.

Another object is to produce an efficient, relatively cheap, double walled tank or container for economically storing a great quantity of liquefied gas at around atmospheric pressure.

A further object is to produce a double walled insulated tank or container for the storage of low temperature liquefied gas at around atmospheric pressure, of such design that as the storage capacity of such tank or container increases beyond 80,000 cubic feet, the cost per cubic foot of storage decreases.

A still further object is to produce improved means for supporting the inner shell of a double walled insulated storage tank or container.

A still further object is to produce improved means for so supporting the inner shell and its contents of a double walled insulated storage tank or container for low temperature liquids that such inner shell is free to expand and contract independently of the outer shell.

Another and important object of this invention is to produce improved means for so supporting the inner shell of a double walled cylindrical storage tank or container, that the floor of such shell is free to expand and contract under load and temperature changes without imparting harmful stresses to such floor or other portions of the inner shell structure.

These and other objects I attain by means of the structures described in the specification and illustrated in the drawings accompanying and forming part of this application.

A storage tank or container embodying this invention comprises inner and outer spaced apart vertically extending cylindrical shells with insulating material within the space between such shells.

The inner shell

Figure 1:
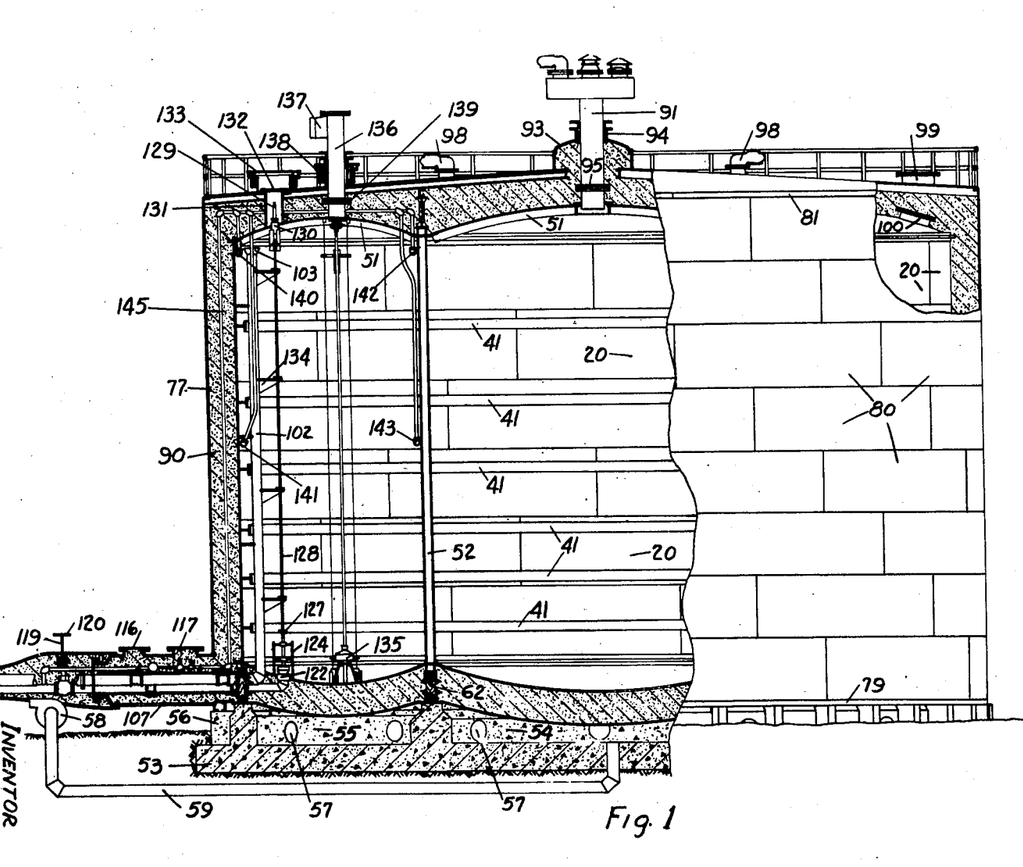
Figure 1 is a view partly in elevation and partly in section of a storage tank or container embodying this invention.
Figure 2:
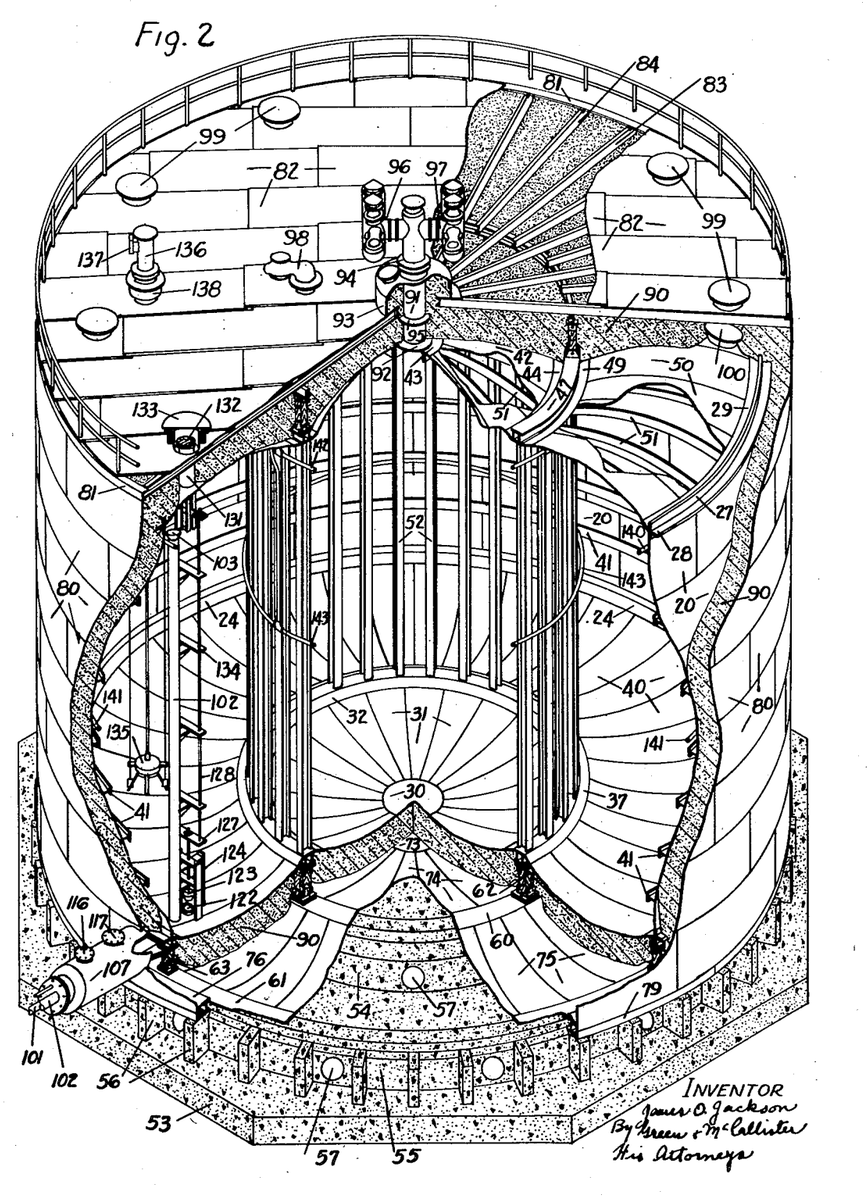
Fig. 2 is an isometric view of the container of Fig. 1 with certain parts broken away in order to more clearly disclose the details of the structure.

In the form of container disclosed in Figs. 1 and 2, the inner shell comprises a vertically extending cylindrical side wall made up of suitably curved generally rectangular plate sections 20 which are preferably butt welded together to form fluid tight joints between the plate sections. Plate sections 20 are arranged in superimposed courses or rows with the vertical joints between the plate sections in one course or row staggered or offset with relation to the vertical joints of the adjacent courses or rows.

Figures 3, 4, 5, 6, 7:
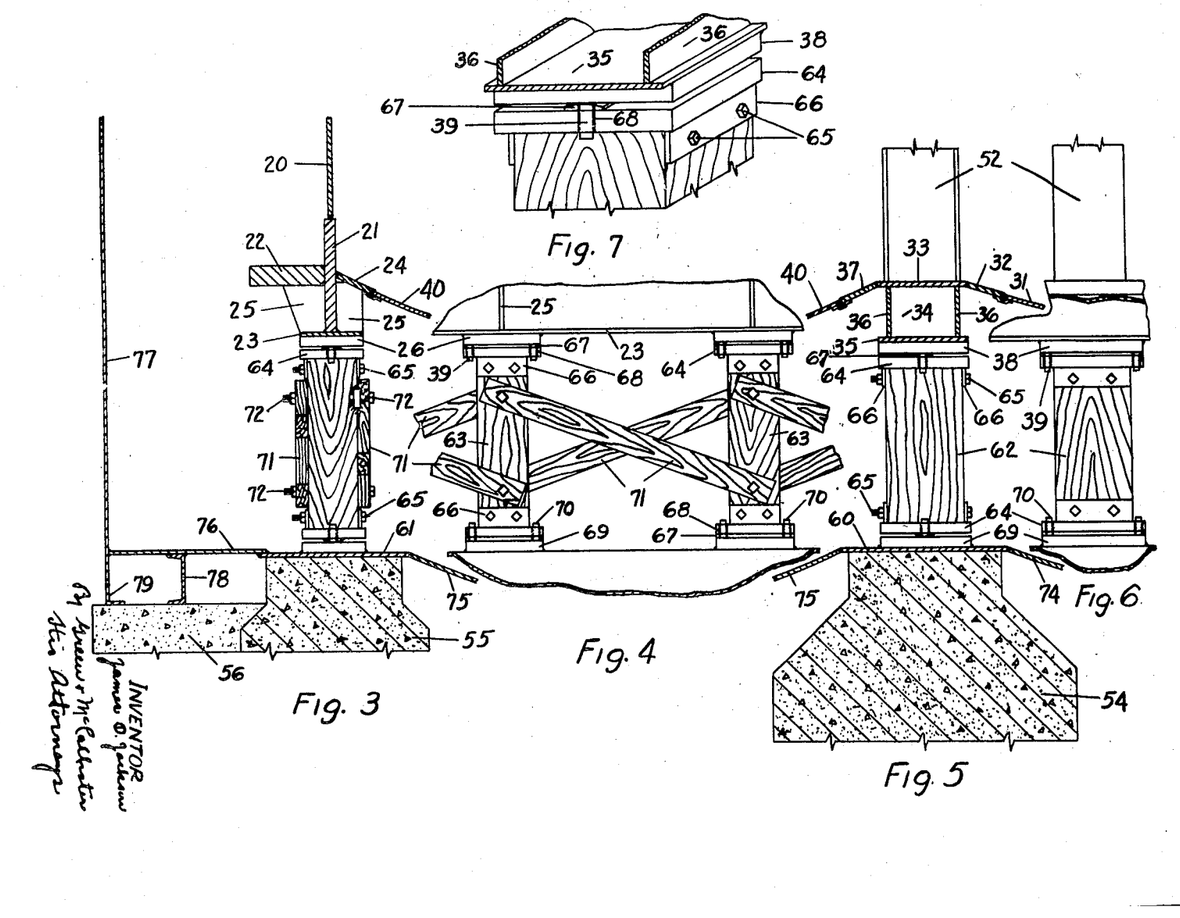
Fig. 3 is a fragmentary view in section and on an enlarged scale of a lower corner structure of the container. This view includes a detailed showing of one of the wooden support posts of the inner shell.
Fig. 4 is an elevational view looking toward the right side of Fig. 3.
Fig. 5 is an enlarged detail view of a portion of the support structure for the inner shell.
Fig. 6 is a view looking toward the right side of Fig. 5 above the foundation.
Fig. 7 is a perspective view on a greatly enlarged scale illustrating the top structure of the support post of Figs. 5 and 6.

As clearly disclosed in Fig. 3, the lower edge portion of the cylindrical side wall has secured thereto, preferably by welding, a heavy cylindrical compression member 21. This compression member is reinforced by a heavy annular bar-like member 22 having its inner peripheral edge welded to the outer face of compression member 21. The bottom edge of the compression member has welded thereto an annular horizontally extending bottom or base member 23. Welded to the inner face of compression member 21 opposite the center of bar-like member 22 is a downwardly inclined plate-like member 24. Member 24, as will be hereinafter pointed out is the member to which the outer peripheral edge of the bottom of the inner shell is secured.

Arranged at intervals around compression member 21, and extending radially of the inner shell structure, are bar-like reinforcing members 25. These are welded in position on opposite sides of compression member 21 between bar-like member 22, inclined member 24 and annular bottom ring 23.

This assembly made up of members or parts 21, 22, 23, 24, and 25 is preferably shop fabricated and forms an extremely rigid ring-like girder at the bottom edge of the cylindrical wall structure of the inner shell.

Secured to the under face of annular ring 23 in line with radially extending bar-like members 25 are bars 26 which, as will be hereinafter pointed ed out, co-operate with the wooden supporting posts by means of which the cylindrical wall structure of the inner shell and the outer peripheral edge portion of the inner shell bottom are supported.

Figure 8:
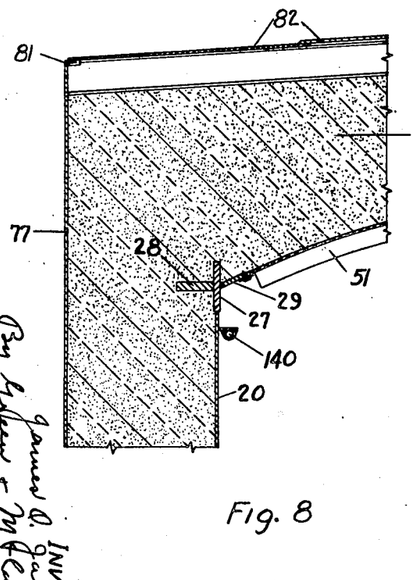
Fig. 8 is a fragmentary sectional view of a top corner of the tank or container and shows the relative position of the inner and outer shells at this point.

As disclosed in Fig. 8, the upper edge of the cylindrical wall of the inner shell, made up of plate sections 20, is reinforced by a heavy continuous, vertically extending ring-like member 27 having its lower edge welded to the top edge of such cylindrical wall.

Member 27 is reinforced by a horizontally extending bar-like ring 28 which surrounds member 27 and has its inner peripheral edge welded to the outer face of member 27 midway between its top and bottom edges. Opposite member 28 and upwardly inclined annular plate member 29 is welded to the inner face of member 27. Member 29 as will be hereinafter pointed out, forms the support to which the outer peripheral edge of the roof of the inner shell is welded.

Floor of inner shell

The bottom portion or floor of the inner shell comprises a downwardly dished central spherical section and an outer downwardly dished toroidal section which surrounds and is concentric with such central section. The central section comprises a circular central saucer-like plate section 30 and a number of radially extending plate sections 31. Plate sections 31 are welded together and to saucer-like member 30 to form fluid tight joints and the outer peripheral edge of the spherical section, made up of the outer curved edges of plate sections 31, is welded to the inner peripheral edge of an annular plate member 32 which has its outer peripheral edge welded to an annular top plate 33 of a box-like ring girder 34 as disclosed in Fig. 5.

Ring girder 34 comprises top plate member 33, an annular bottom plate member 35 and side plate members 36. An annular plate member 37 corresponding to member 32 is welded to the opposite edge of plate member 33 from member 32. Members 32 and 37 are downwardly inclined as shown in Fig. 5.

Bar members 38 are welded to the bottom face of ring girder 34 at regularly spaced intervals. Bar members 38 correspond to bars 26 that enter into the make-up of the bottom edge structure of the cylindrical wall of the inner shell. Bar members 38, as well as bars 26, have welded thereto on their longitudinal center line and adjacent their opposite ends, downwardly extending rod-like pins 39, the function of which will be later described.

The toroidal section which surrounds the spherical section of the inner shell bottom is made up of a number of radially extending sections 40 that are butt welded together to form fluid tight joints. The inner peripheral edge of this toroidal section is welded to annular plate member 37 while the outer peripheral edge of such section is welded to annular plate member 24.

The inner shell bottom or floor resists hydrostatic and pressure loads by tensile stress in the spherical and toroidal sections. These sections require no stiffening nor support except that derived from ring girder assembly 34 and the compression ring assembly made up of parts 21–25 inclusive. Supports are provided for the ring girder and compression member as will be later explained.

The proportions of the spherical and toroidal sections of the floor or bottom of the inner shell are so chosen with respect one to the other, that the radial horizontal inward and outward components of force at ring girder 34, occasioned by tensile stresses in the spherical and toroidal sections resulting from hydrostatic or pressure loadings, are equal or nearly equal.

The radial and horizontal components of force at the outer periphery of the toroidal section, which also arise from tensile stresses occasioned by hydrostatic or pressure loadings, are resisted by the compression ring assembly made up of parts 21–25 inclusive. Such parts are so proportioned that adequate strength and stiffness is obtained.

Although only one toroidal section is illustrated in the container of Figs. 1 and 2, it will be apparent that two or more such sections, concentric with each other, may be employed if desired. If more than one toroidal section is employed, a ring girder assembly similar to ring girder assembly 34 will be employed at the intersection of such concentric toroidal sections. Two or more toroidal sections may be found advantageous in tanks or containers of specially large diameter.

In tanks or containers of large diameter, I find it desirable to stiffen or reinforce the cylindrical wall of the inner shell by means of stiffeners 41. Each of these consists of a circular member of T-section, with the web of the T lying in a horizontal plane and with the flange of the T spaced inwardly of the inner face of the cylindrical wall. The outstanding leg or web of the T is welded to the inner face of the cylindrical wall. Such stiffeners are spaced apart vertically and may extend throughout the height of the cylindrical wall. They not only serve as compression rings, thus preventing the pressure, imposed by the insulating material between the shells, from collapsing the inner shell, but where the plate sections forming the cylindrical shell wall are of light gauge, the stiffeners serve to force the vertical wall outwardly, thus preventing buckling of the same as the inner shell expands with relation to the outer shell.

*Inner shell roof*

The roof of the inner tank shell is almost identical with the bottom except that the structure is inverted with respect to the bottom structure, that is, the central spherical section and the toroidal section are both upwardly dished.

The inner ends of plate sections 42 of the spherical section of the roof, instead of connecting, at the center of such spherical section, with a saucer-shaped plate member, are welded to an annular plate section 43. The outer peripheral edge of the central spherical section is welded to an annular plate member 44. Plate member 44, at its inner peripheral edge is welded to the bottom member 45 of a box-like ring girder 46. This ring girder has a top member 47 and side members 48.

An annular plate-like member 49 has its inner peripheral edge welded to bottom member 45, and the inner peripheral edge of the toroidal roof section, made up of plate sections 50, is welded to this annular member 49. The outer peripheral edge of the toroidal section is welded to upwardly inclined annular plate member 29 which forms part of the ring girder assembly welded to the upper edge of the cylindrical wall of the inner shell.

The spherical and toroidal sections of the roof are reinforced by stiffening members 51 which are edge bowed platelike strips extending radially of the roof and which have their upper edges welded to the inner face of both the spherical and toroidal roof sections.

*Roof supports for inner shell*

Girder 46 is supported by a circular series of column-like members 52 which are of sufficient number and strength to form a major support for the roofs of both the inner and outer shells of the tank structure as will later appear.

Columns 52 extend from ring girder 34 to ring girder 46 to which they are welded.

In tanks or containers in which more than one toroidal section is employed, more than one circular row of columns such as columns 52 will be employed; the number of rows of columns being equal to the number of toroidal sections employed, and therefore, equal to the number of ring girders in both the bottom and roof structures.

*Foundation*

The tank or container is mounted on a reinforced concrete foundation which supports it well above the ground. The foundation comprises a flat heavy reinforced concrete slab-like portion 53 having two concentric annular piers projecting upwardly therefrom. One such pier which is numbered 54 is located directly below ring girder 34 and the other, which is numbered 55, is located directly below the outer ring girder to which the lower edge of the cylindrical shell is secured.

Pier 55 is provided with a number of rectangular block-like members 56 which extend radially outward therefrom and form supports for the outer peripheral portion of the outer shell, as will be later disclosed.

Piers 54 and 55 are provided with openings 57, and an exhaust fan 58, by means of a suitable conduit 59, connects with the center of the space between the bottom of the tank and slab 53. By this arrangement, forced circulation of air below the tank or container is maintained; air being drawn into the center of this space through openings 57. Because of this, the temperature beneath the tank bottom is practically the same as the temperature of the surrounding ground.

The outer tank shell, which will be later described, has a bottom which is very similar to the inner shell bottom, that is, it has a central spherical section and a surrounding toroidal section. These sections are downwardly dished and parallel the corresponding sections of the inner shell bottom. The outer shell bottom, however, is not provided with girders corresponding to ring girder 34 and the girder at the bottom edge of the inner shell side wall, but between the central spherical section and the outer toroidal section, is provided with a flat annular plate member 60 that is supported on the top of pier 54. A flat annular plate-like member 61 is also supported on the top of pier 55.

*Supporting means for the inner tank shell and its contents*

The inner tank and its contents are supported by two concentric circular rows of spaced wooden posts. The inner circular row of posts 62 is located between ring girder 34 and annular plate member 60 on pier 54, while the circular row of posts 63 is located between annular plate member 61 on pier 55 and the ring girder made up of parts 21-25 inclusive forming the bottom portion of the cylindrical wall of the inner shell.

These circular rows of posts are located directly below these girder members as clearly shown in Figs. 1, 2, 3 and 5. As disclosed in Figs. 3-7 inclusive, the end of each of these wooden posts is protected by means of rectangular steel cap members 64. These cap members are bolted to the posts by bolts 65 which pass through the posts and gusset plates 66 which are either formed as part of plates 64 or are welded thereto.

Each member 64 is provided with a cylindrical or rounded projection 67 which is so positioned that its axis is tangent to the circular row defined by the columns 52. Each of these cylindrical projections, on its center line adjacent its ends, is provided with two holes 68 which not only extend through the cylindrical projection, but through the body of member 64. Through these holes rod-like pins 39 project (Figs. 3, 5 and 7). Holes 68 are over-size with relation to rod-like pins 39. The pins anchor the posts in position, and the cylindrical projections and over-size holes permit tilting or pivotal movement of the posts.

It will be understood that beneath each post 62 and 63, and secured as by welding to annular plate member 60 or 61 as the case may be, a bar-like member 69 is provided and each of these bar-like members is also provided with two rod-like pins 70 corresponding to pins 39.

These posts, due to the arrangement of cylindrical projections 67, pins 39 and 70 and the over-size holes, are capable of tilting radially with relation to foundation piers 54 and 55 during expansion and contraction of such shell.

It will be appreciated that provision for this tilting movement is important because of the shrinkage that occurs in the inner shell structure when the tank or container is put into low temperature service.

The post assembly structures serve to transmit the load of the inner tank and its contents to piers 54 and 55 of the foundation. The slab-like base portion 53 of the foundation, of which the piers are a unitary part, being poured therewith, distributes this load evenly over the ground beneath the tank.

The posts are preferably formed from some wood having a relatively low thermal conductivity, such as Douglas fir.

Posts 63 constituting the outer circular row are interconnected by diagonally disposed wooden bracing members 71, located on opposite sides thereof (Figs. 3 and 4) and which are connected to the posts by through bolts 72. These members brace the posts tangentially, thus preventing lateral displacement of the inner shell with relation to pier 55. They, however, do not interfere to any appreciable extent with the necessary tilting of posts 63 during expansion and contraction of the inner shell. Such bracing members are not required for posts 62.

*Outer tank shell*

The outer tank shell, as above pointed out, surrounds and is spaced from the inner shell. It has a vertically extending cylindrical wall, and a bottom which is similar to the inner shell bottom in that it has a central spherical section and an outer toroidal section surrounding such spherical section. These sections parallel the corresponding sections of the inner shell bottom.

The central spherical section of the outer shell bottom comprises a saucer-like plate member 73 and plate sections 74 which extend radially outward therefrom. These sections are welded together and to the saucer-like member to form a fluid tight structure. The outer peripheral edge of the spherical section is welded to the inner peripheral edge of annular plate member 60 which rests on pier 54.

The toroidal section of the outer shell bottom is made up of radially extending plate sections 75. These sections are welded together, and the inner ends of such sections are welded to the outer peripheral edge of plate member 60. The outer peripheral edge of this toroidal section is welded to the inner peripheral edge of plate member 61 which rests on piers 55.

The bottom of the outer tank shell is completed by an annular plate member 76 which laps over the outer peripheral edge of annular plate member 61 to which it is welded. The outer peripheral edge of plate member 76 contacts with the inner face of the cylindrical wall 77 (Fig. 3) of the outer tank shell and is preferably fillet welded to such shell.

Plate member 76 is supported adjacent its center by a ring girder 78 of channel section with its web extending vertically as shown in Fig. 3. Girder 78 rests on and is supported by block-like extensions 56 which project radially outward from the base of pier 55.

Cylindrical wall 77 of the outer tank shell has its bottom formed by an angle member 79 which is bent to a circle of the same diameter as that of cylindrical wall 77 of the outer tank shelf.

The upstanding leg of angle 79 forms the bottom portion of cylindrical wall 77, while the horizontal leg, as shown in Fig. 3, rests on extensions 56 of pier 55.

The cylindrical wall of the outer shell is formed of curved rectangular plate sections 80 arranged in horizontal courses or rows with the joints in one row staggered or offset with respect to those in the adjacent rows. The joints between these plate sections are butt welded together to form a fluid-tight structure.

The top of the cylindrical wall 77 is completed by a steel angle 81 (Fig. 8). The roof of the outer shell is a flattened cone which slopes gently upward from its outer peripheral edge to its center. The roof is formed of a plurality of plate sections 82, of generally rectangular shape and these plate sections are preferably lap welded together; the laps being so arranged as to permit free drainage. Roof plate sections 82 are supported by a number of radial rafters 83 and 84 which extend inwardly from cylindrical wall 77 of the outer shell.

Radial rafters 83 are cantilevered over a channel-shaped ring girder 85 which is supported from ring girder 46 by a series of wooden posts 86.

The inner ends of radial girders 83 meet near the center of the roof structure and are preferably tied together as by welding so that they are held in proper position. Radial rafters 84 equal in number rafters 83 and are spaced midway between rafters 83. They extend from the outer tank shell 77 to ring girder 85, to which they are welded.

Figure 9:
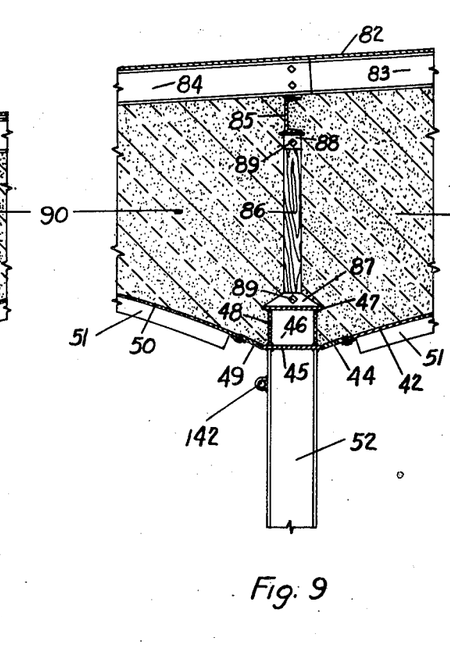
Fig. 9 is a fragmentary sectional view taken through the tank adjacent its top and shows the type of supporting means for the roofs of the inner and outer shells.
Figure 10:
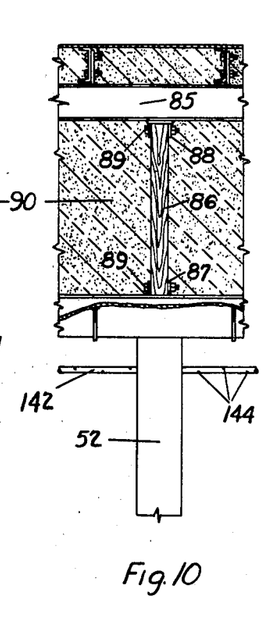
Fig. 10 is a view looking toward the right of Fig. 9.

Wooden posts 86 which support ring girder 85, are equal in number to columns 52 and are positioned immediately above such columns. Each wooden post 86 is secured to ring girders 46 and 85 by means of gusset plates 87 and 88. These gusset plats are welded to the girders and the posts are pivotally secured between the gusset plates by bolts 89; one at each end of each post. These bolts are placed with their axes tangential to the girders so that each post is essentially a hinge ended column allowing free radial displacement of one such girder with relation to the other. This allows the inner tank shell to shrink or expand freely without restraint from the outer tank shell (Figs. 9 and 10).

Insulating material 90 such as granulated cork, or some other suitable finely divided material of low thermal conductivity, substantially fills the space between the inner and outer shells.

A suitable venting apparatus, extending upwardly above the center of the roof, connects with the interior of the inner shell by means of a pipe 91. This pipe extends through annular plate member 43 which forms the central portion of the spherical section of the roof of the inner shell. Pipe 91 carries a flange 92 which is welded to section 43 (Fig. 2).

Pipe 91 passes up through the insulation between the shells and through a dome-like structure 93 equipped with a stuffing box, or an expansion joint 94 which provides a fluid tight seal between pipe 91 and dome-like structure 93. Dome-like structure 93 is welded to roof plates 82.

Pipe 91 is provided with a thermal stop joint 95. Near its top, pipe 91 has horizontal branches 96 and 97 which communicate with devices having rupture disks and relief valves (not shown). These rupture disks and relief valves are constructed and arranged to vent vapor from the inner shell when a predetermined vapor pressure is exceeded, and to admit air to the inner shell when more than a predetermined vacuum occurs within the inner shell.

Members 98 (Fig. 1), communicating with the space between the shells and secured to the outer shell roof, are equipped with pressure relief and vacuum relief devices (not shown). These devices are set to operate under a few ounces of pressure or vacuum, in order to vent the space between the shells when such venting becomes desirable or necessary.

The roof of the outer shell is equipped with a number of manholes 99. These give access to the space between the shells and facilitate placing and distribution of the granular insulating material.

Directly under one or more of these manholes 99 the inner shell roof is provided with one or more manholes 100 which provide means for gaining access to the interior of the inner shell.

*Inlet and outlet connection and vapor vent connection to the inner tank shell*

Figure 11:
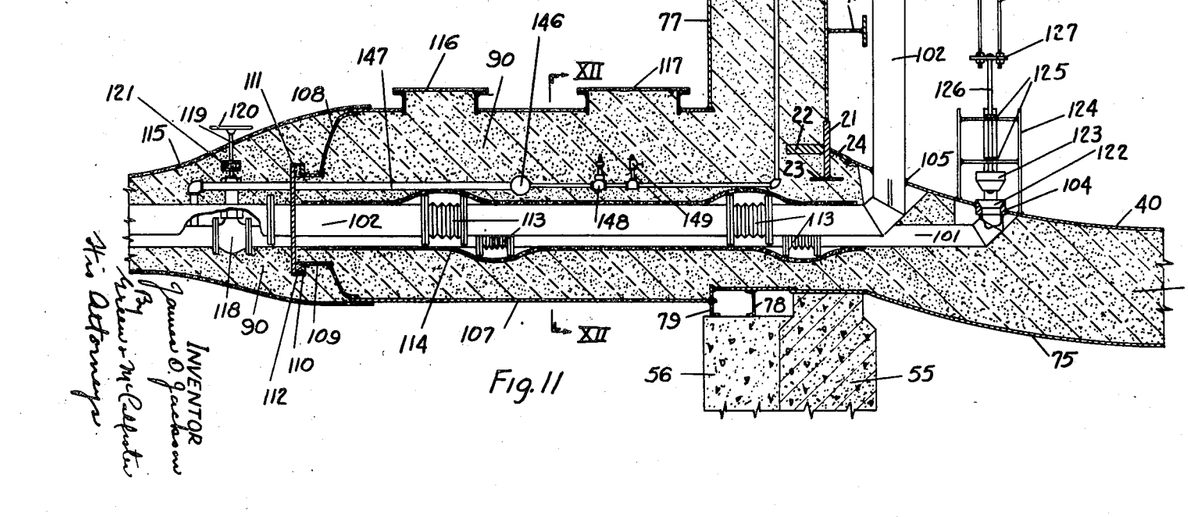
Fig. 11 is a sectional view taken through the longitudinal center of a boot-like extension of the outer shell. This view shows the inlet and outlet for liquefied gas and the conduit by which gas evaporating from the liquid within the container is continuously vented.
Figure 12:
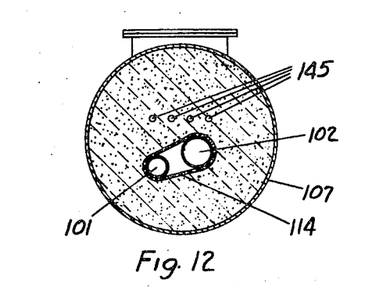
Fig. 12 is a transverse sectional view of the boot-like extension and is taken on line XII—XII of Fig. 11.

A single pipe or conduit 101 serves to admit liquefied gas to the interior of the inner shell and to discharge the same from such shell. A relatively large vapor pipe or conduit 102 passing through the bottom of the inner shell, has its open upper end 103 located within the inner shell adjacent its top. These pipes or conduits 101 and 102 are welded in place within openings in the bottom of the inner shell as indicated at 104 and 105, Fig. 11. The vapor vent conduit is supported from the cylindrical wall of the inner shell by support and bracing members 106 that are welded to the conduit and to such cylindrical wall. Pipes or conduits 101 and 102 pass horizontally in side by side or heat shielding relation, through a tubular extension 107 of the outer shell. Extension 107, which resembles a boot, is welded in place within an opening in the outer shell near its bottom (Figs. 1, 2 and 11).

The outer end of boot 107 is provided with a dished head 108 having an eccentrically located opening to the edge of which one end of a cylindrically formed collar 109 is welded. Collar 109 at its outer end is provided with a surrounding flange 110. The outer end of collar 109 is closed by a metal plate 111 which is provided with two openings through which pipes or conduits 101 or 102 pass. These are welded to plate 111 to form fluid-tight joints and plate 111 is separated from flange 110 by an annular thermal stop member 112.

Since conduits 101 and 102 are subject to wide variations in temperature, and therefore to a considerable amount of expansion and contraction, each of these conduits is equipped with two bellows-like expansion joints 113.

In order to minimize the infiltration of heat through the boot to these conduits and to improve the heat shielding relation of these conduits, one to the other, the horizontal sections of the conduits located within boot 107 inwardly of end member 111 are wrapped with a sheet insulating material 114. The boot surrounded by this sheet insulating material is filled with finely divided or granular insulating material 90.

Beyond the outer end of the boot and in effect forming a continuation thereof, sheet-like insulating material 115 surrounds conduits 101 and 102 and is spaced a distance from said conduits as disclosed in Fig. 11. This insulating material 115 preferably extends to the liquefaction plant (not shown) and the space between such insulating material and the conduits is filled with finely divided insulating material such as 90.

The boot is provided with manholes 116 and 117 and one or both of these can be used for filling the boot with the insulating material.

Beyond end plate 111, inlet and outlet conduit 101 is provided with a shut-off valve 118. The stem 119 of said valve projects upwardly through insulation 115, and at its top is provided with a hand wheel 120. The stem of the valve is provided with a thermal stop 121.

Inlet and outlet conduit 101 terminates at the bottom of the inner shell and as above pointed out, said conduit is welded in position within an opening in the bottom of the inner shell. The end of the conduit is provided with a member 122 which forms a seat for a plug valve member 123.

A frame 124 welded to the inner shell bottom adjacent conduit 101, is provided with a guideway 125 within which the stem 126 of valve member 123 is slidably mounted. This valve stem at its top is provided with a cross arm 127 and two rods 128 extend upwardly from this cross arm to a valve operating device which includes a rod 129.

This rod passes through a packing gland 130 which is secured within an opening in the inner shell roof.

A tubular member 131 of low thermal conductivity surrounds the valve operating device and extends upwardly from the inner shell through the outer shell roof. The top of tubular member 131 is normally closed by a wooden or other low thermal conductivity cover 132, and an interleaving liquid sealing device 133 supported by the roof of the outer shell, gives access to rod 129 of the valve operating device. By means of rod 129, plug valve member 123 may be operated to open or close conduit 101 from a position outside the inner shell.

Figure 13:
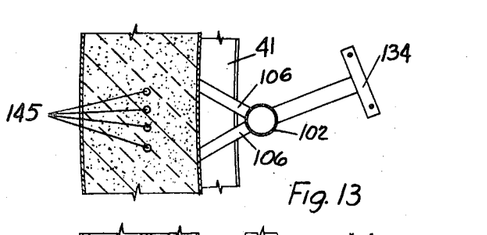
Fig. 13 is a sectional view taken on line XIII—XIII of Fig. 11, with the boot-like extension omitted.

Rods 128 by which plug valve member 123 is raised from and lowered to closed position pass through spaced guides 134 which are secured to vent gas conduit 102 (Figs. 1, 11 and 13).

Tubular member 131 which houses the valve operating device, including rod 129, prevents the granular insulating material 90 from contacting such device and said rod.

Apparatus for indicating and recording the level of the liquefied gas within the inner shell, as well as variations in such level, is disclosed in Figs. 1 and 2. This apparatus is operated by a float 135 and includes indicating and recording mechanism (not shown) which are located within a tubular member 136 and a housing 137 carried by such member.

Tubular member 136 is secured to the inner shell roof, extends through the insulating material between the inner and outer shell roofs and through an interleaving liquid sealing device 138. Member 136 is provided with a thermal stop 139 between the inner and outer shell roofs.

It is imperative that all parts of the inner shell structure be fabricated from metal that will not lose its ductility and ability to withstand strains at temperatures as low as the temperature of the liquefied gas to be stored. In the case of liquefied natural gas, this is about −260° F.

While copper and aluminum have suitable ductility at these low temperatures, I prefer to use a low carbon nickel steel alloy having a nickel content of at least about 3½%. I make use of such alloy for the plate sections, for columns 52, conduits 101 and 102, for stiffener 51, for the ring girders 34 and 46, as well as for those at the top and bottom of the cylindrical wall of the inner shell. In fact, all of the inner shell parts or all parts that have metal to metal contact with the inner shell should be made from metal that has an impact value of at least 15 foot pounds (Charpy) at the temperature of the liquefied gas to be stored.

It is also imperative that all welds entering into the make-up of the inner shell structure, or all welds that are subject to these low temperatures be free from embrittlement, and have an impact value at such low temperatures at least equal to that of the base metal. I, therefore, prefer to use an iron chromium nickel alloy containing from 15-30% chromium and from 10-20% nickel. I prefer to use the electric arc method of welding and I prefer to use coated weld rods since by their use, better welds are obtained.

*Means for conditioning tank or container to receive low temperature liquefied gas*

Storage tanks or containers such as herein disclosed must be properly precooled before being filled with low temperature liquefied gas, even though such gas is to be stored at a pressure not much greater than atmospheric pressure. This applies particularly to tanks or containers in which the inner shell structure is fabricated from a ferrous alloy.

Unless all parts of the inner shell structure are slowly and uniformly cooled down from atmospheric temperature to the temperature of the liquefied gas to be stored, the introduction of such liquefied gas may cause a thermal shock or stress in some part of the inner shell structure that will rupture such structure and render the entire tank or container useless.

For this reason, I provide as a permanent part of each such tank or container, means by which this slow uniform cooling down can be accomplished in accordance with the method disclosed in an application filed by me on September 20, 1944, and Serially Numbered 553,924, now Patent No. 2,499,836.

The means for carrying out such method includes four coils, 140-143 inclusive, of ¾ inch copper pipe which is installed within the inner shell. Coil 140 extends circumferentially of the inner shell and is secured to the interior thereof just below the roof of the inner shell. Coil 141 is similarly placed around the interior of the inner shell about midway between its top and bottom. Coil 142 surrounds and is carried by the circular row of column-like members 52 adjacent the roof and coil 143 surrounds and is supported by said column-like members about midway between the roof and the bottom of the inner shell.

Throughout the length of each coil, small holes (indicated by 144 in Fig. 10) of the order of .04 of an inch in diameter are drilled. These are spaced at about one foot intervals and on a number of different axes, the choice depending on the position of the coil within the inner shell and the position of the shell structure the jets of precooling liquid issuing from such holes are designed to reach. These holes are of such number and are so positioned as to cause jets of precooling liquid issuing therefrom to contact all parts of the inner shell structure.

Coils 140-143 inclusive are supplied with precooling fluid by means of four pipes 145. These pipes are connected into a header 146 located within boot 107. Header 146 by means of a pipe 147, connects with inlet and outlet pipe 101 beyond valve 118 (Fig. 11).

Below manhole cover 117 of the boot, each pipe 145 is provided with a control valve 148 and a connection 149 for a low temperature pressure gauge. Pipes 145 which are preferably copper pipes, extend up through the insulation between the inner and outer shells as shown in Figs. 1 and 11, and thence down through the roof of the inner shell to the coils. It will be understood that these pipes pass through holes in the roof of the inner shell and are brazed in position within such holes so that the joints are fluid tight.

Pipes 145 have been omitted from Figs. 8, 9 and 10 for the purpose of simplifying the drawings, but it will be understood that they are preferably installed as disclosed in Fig. 1.

During a precooling procedure, manhole cover 117 will be removed so that valves 148 can be properly controlled. Low temperature gauges will be connected by means of suitable piping to connections 149, so that the force of the precooling fluid in the different coils can be controlled in accordance with the temperature indicated by temperature indicating devices located at different positions around the inner shell structure.

Figure 14:
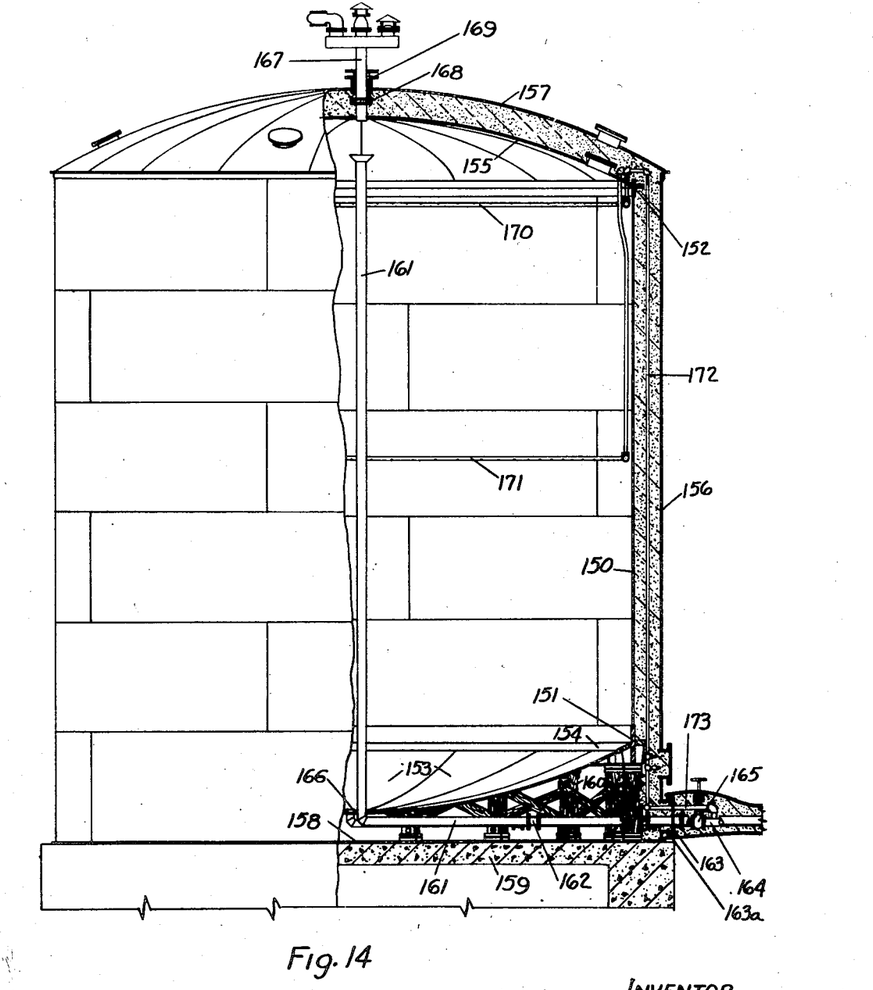
Fig. 14 is a view partially in section and partially in elevation of a modified form of tank or container embodying certain of the features of the tank or container of Figs. 1 and 2.

Container of Figure 14

The modified tank or container illustrated in Fig. 14 has inner and outer spaced apart vertically extending cylindrical metal shells with insulating material between the side walls and the roofs of such shells. The cylindrical walls of both the inner and outer shells are similar to those of the shells of the container of Figs. 1 and 2.

The cylindrical wall 150 of the inner shell is provided with a stiffening ring or girder 151 at its lower edge made up of parts corresponding to parts 21–25 inclusive. The top of the cylindrical wall of this shell is provided with a stiffening ring 152 made up of parts corresponding to parts 27–29 inclusive.

The bottom 153 of the inner shell takes the form of a downwardly dished spherical segment having its outer peripheral edge welded to the inner peripheral edge of a downwardly inclined annular member 154, the member corresponding to member 24.

The roof 155 of the inner shell is a spherical segment similar to bottom 153 but is upwardly dished to form a dome. Its outer peripheral edge is welded to the inner peripheral edge of an annular plate-like member corresponding to member 29. Although stiffener members corresponding to stiffener members 51 are not illustrated, it will be apparent that similar stiffeners may be used when the size of the tank or container makes their use advisable.

Cylindrical wall 156 of the outer tank shell is similar to the cylindrical wall of the outer shell of the container of Figs. 1 and 2. The roof 157 of the outer shell is also a dome and is similar to the roof of the inner shell.

The bottom or floor 158 of the outer shell is flat and is supported on a circular slab-like portion 159 of a concrete foundation which is constructed and arranged to support the tank or container well above the ground and permit natural or forced circulation of air below the tank or container.

The inner tank shell is supported by a circular row of wooden posts 160 which are similar in all respects to posts 63. Posts 160 are braced by braces corresponding to braces 71 and are mounted for tilting during expansion and contraction of the inner shell due to temperature changes. As will be seen from Fig. 14, posts 160 are mounted directly below cylindrical wall 150.

A vapor vent conduit 161 extends axially of the container, passes through the inner shell bottom to which it is secured at its center and extends outwardly through a boot which is similar to boot 107. The vapor vent conduit is provided with an expansion joint 162 in its horizontal leg.

A liquefied gas inlet and outlet conduit 164 having a control valve 165 has its inner end 166 secured within an opening in the inner shell bottom adjacent the center of such bottom. The valve mechanism by means of which inlet and outlet conduit 164 is controlled has been omitted, but it will be understood that a plug valve and valve operating mechanism similar to that disclosed in connection with the tank or container of Figs. 1 and 2 are employed.

Vapor conduit 161 and inlet and outlet conduit (liquid line) 164 pass through a circular disk 163 to which they are welded. Disk 163 is insulated from the outer shell 156 by means of a thermal stop 163a and is of less diameter than the boot and therefore does not make metal to metal contact therewith.

A tubular member 167 similar to tubular member 91 and provided with a thermal stop 168 has its lower end welded within an opening in the inner shell roof. At its outer end member 167 carries vacuum pressure relief devices which may be of standard design. Tubular member 167 passes through a packing gland 169 which is secured to the roof of the outer shell.

Coils 170 and 171 for precooling fluid are provided and these coils are supplied with precooling fluid by means of pipes 172 which extend upwardly through the insulation between the inner and outer shells, and, passing downwardly through openings in the inner shell roof, within which they are brazed, connect with a header 173 which also passes through disk 163 to which it is welded and joins inlet and outlet conduit 164 beyond valve 165.

Container of Figures 15–18 inclusive

In Figs. 15–18 inclusive, a container embodying still further modifications of this invention is disclosed. Since this modification relates particularly to the inner and outer shell bottoms and the supports for the same and the inner shell, I have only illustrated the bottom portion of the container and the foundation.

The container of this modification also comprises inner and outer spaced apart vertically extending cylindrical shells with insulating material between the shells. The cylindrical walls of both the inner and outer shells may be similar to those of the shells of the container of Figs. 1, 2 and 14, except that a ring girder similar to ring girder made up of parts 21–24 inclusive (Fig. 3) is not required, since there is no horizontal force imposed on the inner shell by the flat bottom.

Figure 15:
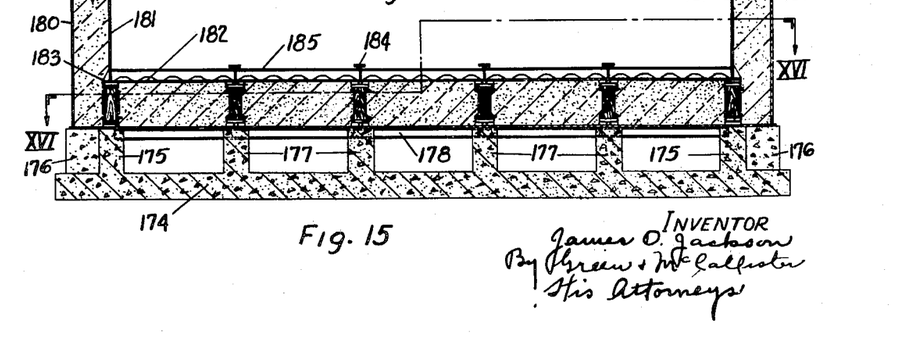
Fig. 15 is a fragmentary sectional elevation of the bottom portion of a still further modified tank or container embodying certain features of the invention of Figs. 1 and 2.
Figure 16:
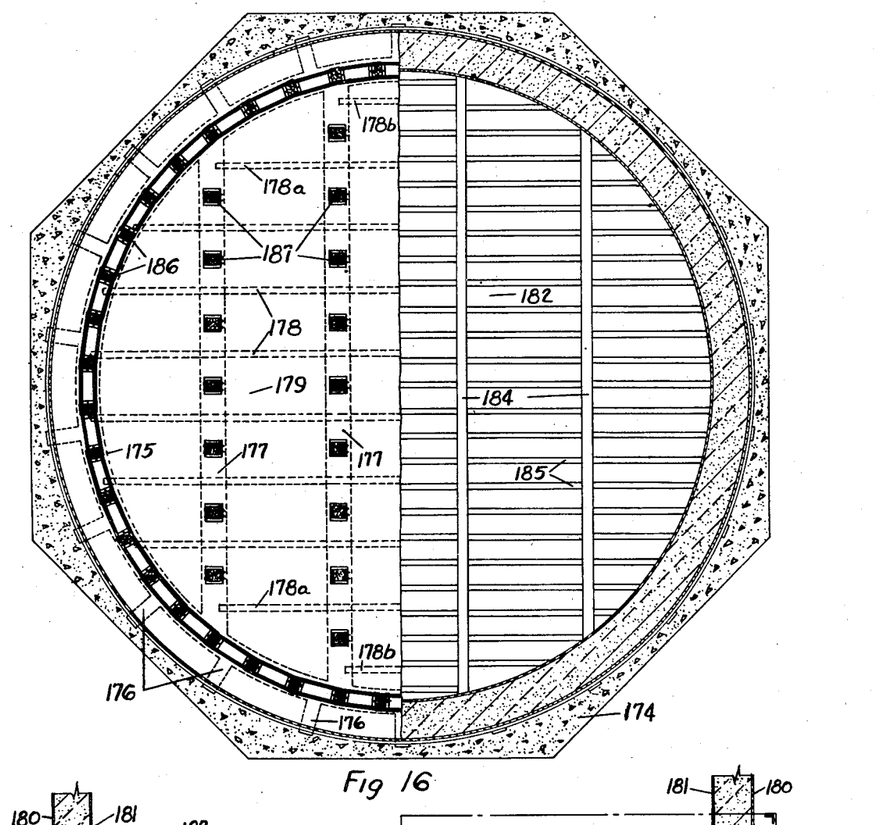
Fig. 16 is a top plan view taken on line XVI—XVI of Fig. 15.

The reinforced concrete foundation, which is poured as a unitary structure, comprises a slab-like portion 174, shown in the drawings as octagonal, an annular pier 175 which extends upwardly from portion 174 and block-like members 176 which extend radially outward from pier 175.

A number, in this case four, of what may be termed chord piers 177 also extend upwardly from slab portion 174, and, paralleling one another, extend to and join pier 175.

Beams 178 shown as steel flange sections, extend at right angles to piers 177. These are spaced apart and all but the outer edge, that is, beams 178a and 178b, extend into annular pier 175. Beams 178a terminate in piers 177 while beams 178b extend into the two central piers 177.

Beams 178 are supported in position before the concrete is poured; for this reason, they are firmly embedded in the piers and have the top surfaces of their upper flanges flush with the tops of the piers.

Bottom 179 of the outer tank shell is flat and is made up of suitable plate sections butt welded together to form a fluid tight structure. This bottom rests on beams 178 and the tops of piers 177, the top of piers 175 and the tops of block-like extensions 176. Thus, the bottom of the outer shell is supported by the beams, the piers and block-like extensions 176 and requires no stiffening means.

The cylindrical wall 180 of the outer shell is welded to bottom 179 adjacent its outer edge and above block-like extensions 176.

The cylindrical wall 181 of the inner shell meets and is welded to the bottom 182 of the inner shell inwardly of its outer peripheral edge 183 (Fig. 15).

Inner shell bottom 182 is stiffened by girders 184 and serrated stiffener members 185 arranged at right angles to such girders. Girders 184 are equal in number to chord piers 177, are located directly above such piers and extending across the bottom 182 of the inner shell, have their ends welded to cylindrical wall 181.

Figure 17:
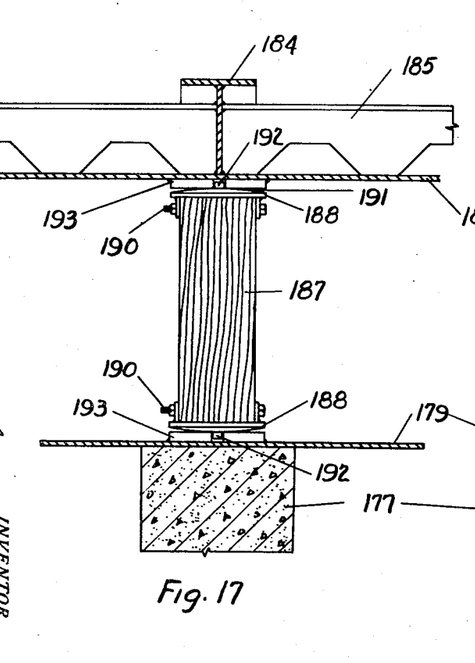
Fig. 17 is an enlarged view looking toward one of the support posts of Fig. 15 with the insulation between the inner and outer shells omitted.
Figure 18:
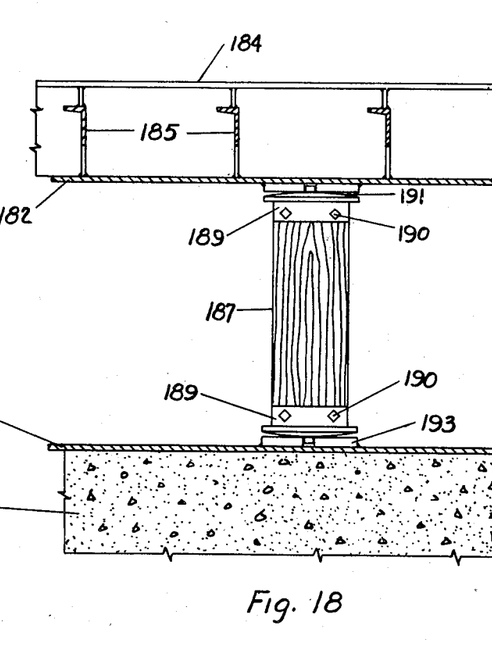
Fig. 18 is a view of the structure illustrated in Fig. 17, taken at right angles to Fig. 17.

Serrated stiffeners 185 are formed by cutting the web of a deep channel section as shown in Figs. 17 and 18. These serrated sections are cut into suitable lenths to reach from girder to girder to which they are welded. They are also welded to the inner shell bottom 182 and the outer sections are welded to cylindrical wall 181.

The inner tank shell, as in the container of Figs. 1 and 2 and Fig. 14, is supported on wooden support posts that are constructed and arranged to tilt during expansion and contraction of the inner shell due to temperature changes.

A circular row of wooden posts 186 is arranged directly below cylindrical wall 181, between the bottom of such wall and that portion of the outer shell bottom 179 located directly above annular pier 175. The posts of this circular row are the same as posts 63 and are braced by diagonally disposed wooden bracing members similar to bracing members 71, and are secured to opposite sides of said posts. These bracing members provide stability against horizontal displacement of the inner tank shell with respect to the outer tank shell, but their cylindrical bearing surfaces corresponding to surfaces 67 and their pins corresponding to pins 39 and 70 permit sufficient radial displacement of the tops thereof with respect to their bottoms.

Between chord piers 177 and girders 184, wooden posts 187 are located. Each of these posts (Figs. 17 and 18) is provided with metal end members 188 having gusset plates 189 bolted to the posts by bolts 190. Each member 188 is provided with a spherical surface 191 and a rod-like pin 192 projecting from the center of such surface into an oversized hole in a bearing member 193. One such bearing member is welded to the bottom 182 of the inner tank shell, and the other to bottom 179 of the outer tank shell. These spherical surfaces permit posts 187 to tilt in any direction in order to accommodate any horizontal movements in the inner tank shell bottom occasioned by expansion and contraction due to temperature changes.

This application is a continuation in part of my co-pending application Serial No. 426,192, filed January 9, 1942, now abandoned.

Having thus described my invention, what I claim as new and desire to secure by Letters Patent is:

1. An insulated container, comprising an outer metal shell, a vertically disposed cylindrical metal shell located within and spaced from such outer shell, a series of spaced substantially vertically disposed support members of low thermal conductivity located within the outer shell between bottom portions of both the inner and outer shell structures, pivotally connected to such bottom portions and being constructed and arranged to support the inner shell and its contents and to tilt during expansion and contraction of the bottom portion of such inner shell.

2. An insulated container comprising an outer substantially cylindrical metal shell, a non-metallic foundation below the outer shell for supporting such shell above the ground, a vertically disposed substantially cylindrical metal shell located within and spaced from such outer shell, and substantially vertically disposed members of low thermal conductivity located between and having pivotal connection with portions of both the inner and outer shell bottom structures above such foundation; the construction and arrangement being such that the weight of the inner shell and its contents is transmitted by such pivoted members to such foundation and such pivoted members tilt during expansion and contraction of the bottom portion of the inner shell.

3. In an insulated container for storing liquefied gas, a fluid tight outer metallic shell, non-metallic ventilated means located below such shell for supporting the same above the ground, an inner fluid tight metallic shell located within and spaced from said outer shell and comprising a cylindrical upright portion, a composite bottom portion made up of a central spherical section and at least one toroidal section surrounding such central section, and a composite roof portion made up of a central spherical section and at least one toroidal section surrounding said central section, an annular box girder to which the adjacent edge portions of the sections of the composite bottom portion are secured, a circular series of column-like supports extending from said box girder to said roof portion, and a circular series of load sustaining members of low thermal conductivity located between said shells below said box girder and mounted for radial pivotal movement during expansion and contraction of the inner shell bottom.

4. An insulated container for storing a relatively great quantity of liquefied gas, comprising an outer shell, an inner vertically extending substantially cylindrical metal shell having its top, bottom and side wall spaced from the top, bottom and sides of the outer shell, spaced tiltable support members of low thermal conductivity located between and having connection with the bottom structures of such shells for supporting the inner shell and its contents, and a one-piece concrete foundation for supporting the outer shell above the ground; such foundation comprising a slab-like base portion, and piers which rise above such base portion, contact the bottom of the outer shell structure directly below such spaced support members and are so constructed as to provide multiple passages for the flow of air between the container and the ground.

5. An insulated container for storing a relatively great quantity of liquefied gas, comprising an outer vertically extending substantially cylindrical metal shell, an inner vertically extending substantially cylindrical metal shell having its top, bottom and side wall spaced from the top, bottom and sides of the outer shell, spaced tiltable support members of low thermal conductivity located between and having operative connection with the bottom structures of such shells for supporting the inner shell and its contents, material of low thermal conductivity occupying substantially all of the space between the bottom structures of such shells not occupied by such spaced support members, and a one-piece concrete foundation for supporting the outer shell above the ground; such foundation comprising a slab-like base portion and piers which rise above such base portion and contact the bottom structure of the outer shell directly below such spaced support members and being so constructed as to provide multiple passages for the flow of air between the container and the ground.

6. An insulated container for storing a relatively great quantity of liquefied gas comprising an outer shell, an inner vertically extending metal shell having its top, bottom and side wall spaced from the top, bottom and sides of the outer shell, a circular row of spaced columns within the inner shell for supporting its roof, spaced tiltable support members of low thermal conductivity located between and having operative connection with the bottom structures of such shells; and directly below such columns for supporting the inner shell and its contents, and a one-piece concrete foundation for supporting the outer shell above the ground and comprising a slab-like base portion and piers rising therefrom and contacting with the outer shell structure; directly below such spaced support members and such columns and being so constructed as to provide multiple passages for the flow of air between the container and the ground.

7. A structure as defined in claim 1, in which the inner shell side wall is provided with top and bottom ring-like stiffening means, the top or roof of the inner shell is secured to such top stiffening means, the bottom of the inner shell is suspended and secured to such bottom stiffening means, and certain of the support members of low thermal conductivity are arranged in a circular row located below such bottom stiffening means.

8. An insulated container for storing a relatively great quantity of liquefied gas, comprising an outer shell, an inner vertically extending metal shell having its top, bottom and side wall spaced from the top, bottom and sides of the outer shell and which, because of the temperature of the material to be stored, must be free to expand and contract, a series of spaced substantially vertically disposed support members of low thermal conductivity located between bottom portions of such shell structures for supporting the inner shell and its contents, and means pivotally connecting each such support member to such bottom portions whereby such support members are capable of tilting sufficiently to permit free expansion and contraction of the inner shell due to temperature changes to which such shell is subjected.

9. A container for storing a relatively great quantity of liquid having a temperature materially different from the prevailing ambient temperature, comprising an outer shell, means below the outer shell for supporting the same above the ground, an inner vertically extending substantially cylindrical metal shell having its top, bottom and side wall spaced from the top, bottom and sides of the outer shell and which, because of the temperature of the material to be stored, must be free to expand and contract independent of the outer shell, a circular series of spaced substantially vertically disposed support members of low thermal conductivity located within the outer shell substantially below the inner shell side wall, and in line with outer shell support means, for supporting the inner shell and its contents, and means pivotally connecting each such support member to the inner shell structure substantially below its side wall and to the outer shell bottom, whereby such support members are capable of tilting sufficiently to permit free expansion and contraction of the inner shell due to temperature changes to which such shell is subjected.

10. A structure as defined in claim 9, in which the roof portion of the inner shell includes a central spherical section and at least on toroidal section, and the roof of the outer shell is substantially flat with a slight pitch from its center to its outer peripheral edge.

11. A structure as defined in claim 9, in which the bottom portion of the outer shell includes a central spherical section and at least one toroidal section, the top of the inner shell includes a central spherical section and at least one toroidal section, and the roof portion of the outer shell has a slight pitch from its center to its outer peripheral edge.

12. A structure as defined in claim 9, in which the pivotally mounted members of low thermal conductivity are interconnected by bracing members.

13. An insulated container for storing a relatively great quantity of liquefied gas, comprising an outer shell, foundation means for supporting such shell above the ground, an inner vertically extending metal shell having its top, bottom and side wall spaced from the top, bottom and sides of the outer shell and which, because of the temperature of the material to be stored, must be free to expand and contract independent of the outer shell, a series of spaced substantially vertically disposed support members of low thermal conductivity located between bottom portions of such shell structures in line with the outer shell foundation means, for supporting the inner shell and its contents, and means pivotally connecting each such support member to such shell structure bottom portions whereby such support members are capable of tilting sufficiently to permit free expansion and contraction of the inner shell due to temperature changes to which such shell is subjected.

14. An insulated container for storing a relatively great quantity of liquid having a temperature differing greatly from the prevailing ambient temperature, comprising an outer shell, an inner metal shell having a vertically extending side wall and having its top, bottom and such side wall spaced from the top, bottom and sides of the outer shell, and which, because of the difference in temperature of the material to be stored from the prevailing ambient temperature, must be free to expand and contract; a series of spaced substantially vertically disposed support members of low thermal conductivity located between bottom portions of such shell structures for supporting the inner shell and its contents, and means pivotally connecting the ends of each such support member to bottom portions of both the inner and outer shell structures, whereby such support members are capable of tilting sufficiently to permit free expansion and contraction of the inner shell due to temperature changes to which such shell is subjected.

15. A structure as defined in claim 1, in which the bottom of the inner shell is suspended.

16. A structure as defined in claim 1, in which the bottom of the inner shell is suspended and comprises a central spherical section and at least one annular toroidal section which surrounds said central section.

17. A structure as defined in claim 1, in which the bottom of the inner shell is suspended and includes a central spherical section and an annular toroidal section surrounding said central section and a ring girder to which the outer peripheral edge of said central section and the inner peripheral edge of said toroidal section are secured.

18. A structure as defined in claim 1, in which the bottom of the inner shell side wall is provided with stiffening means, in which the bottom of the inner shell includes a central spherical section, an annular toroidal section surrounding such central section, a ring girder to which the outer peripheral edge of such central section and the inner peripheral edge of such toroidal section are secured, and in which the outer peripheral edge of such toroidal section is secured to said inner shell side wall stiffening means.

19. A structure as defined in claim 1, in which the bottom of the inner shell side wall is provided with stiffening means, in which the bottom of the inner shell includes a central spherical section, an annular toroidal section surrounding such central section, a ring girder to which the outer peripheral edge of such central section and the inner peripheral edge of such toroidal section are secured, in which the outer peripheral edge of such toroidal section is secured to said side wall stiffening means, in which a circular series of column-like members extends from said ring-like girder to the roof of the inner shell and in which a circular row of support members of low thermal conductivity is located below such ring girder and pivotally connected thereto and to the bottom of the outer shell.

20. A structure as defined in claim 1, in which the bottom of the inner shell is substantially flat.

21. A structure as defined in claim 8, in which the bottom of the inner shell is substantially flat.

22. An insulated container for storing a relatively great quantity of liquefied gas comprising an outer shell, an inner vertically extending substantially cylindrical metal shell having its top, bottom and side wall spaced from the top, bottom and sides of the outer shell, spaced support members of low thermal conductivity located between and pivotally connected to the bottoms of such shell structures for supporting the inner shell and its contents, and a foundation for supporting the outer shell above the ground, and being so constructed as to provide multiple passages for the flow of air between the container and the ground.

23. An insulated container for storing a relatively great quantity of liquefied gas comprising an outer shell, an inner vertically extending substantially cylindrical metal shell having its top, bottom and side wall spaced from the top, bottom and sides of the outer shell, spaced support members of low thermal conductivity located between and pivotally connected to the bottoms of such shell structures below the inner shell side wall for supporting the inner shell and its contents, and a foundation for supporting the outer shell above the ground, and being so constructed as to provide multiple passages for the flow of air between the container and the ground.

24. An insulated container for storing a relatively great quantity of liquefied gas comprising an outer shell, an inner vertically extending substantially cylindrical metal shell having its top, bottom and side wall spaced from the top, bottom and sides of the outer shell, spaced support members of low thermal conductivity located between and pivotally connected to the bottoms of such shell structures for supporting the inner shell and its contents, and a foundation for supporting the outer shell above the ground, and being so constructed as to provide multiple passages for the flow of air between the container and the ground; such pivotal support members including a circular row located substantially directly below the inner shell side wall.

JAMES O. JACKSON.

REFERENCES CITED

The following references are of record in the file of this patent:

UNITED STATES PATENTS

| Number | Name | Date |
| --- | --- | --- |
| 1,661,659 | Gray | Mar. 6, 1928 |
| 2,198,315 | Nyberg | Apr. 23, 1940 |
| 2,237,308 | Larson | Apr. 8, 1941 |
| 2,256,673 | Hansen | Sept. 23, 1941 |
| 2,260,570 | John | Oct. 28, 1941 |
| 2,303,126 | Koppel | Nov. 24, 1942 |
| 2,303,427 | Billner | Dec. 1, 1942 |
| 2,329,765 | Jackson et al. | Sept. 21, 1943 |
| 2,333,792 | Jackson | Nov. 9, 1943 |
| 2,349,096 | Jackson | May 16, 1944 |
| 2,354,691 | Lebedeff | Aug. 1, 1944 |
| 2,363,992 | Reiser | Nov. 28, 1944 |
| 2,375,442 | Sandberg | May 8, 1945 |